United States Patent
Uchida

(10) Patent No.: US 8,692,411 B2
(45) Date of Patent: Apr. 8, 2014

(54) WIRELESS ELECTRIC POWER SUPPLY METHOD AND WIRELESS ELECTRIC POWER SUPPLY APPARATUS

(75) Inventor: Akiyoshi Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1045 days.

(21) Appl. No.: 12/748,898

(22) Filed: Mar. 29, 2010

(65) Prior Publication Data

US 2010/0244581 A1    Sep. 30, 2010

(30) Foreign Application Priority Data

Mar. 31, 2009   (JP) .................................. 2009-086565

(51) Int. Cl.
*H01F 27/42* (2006.01)
(52) U.S. Cl.
USPC ......................................................... 307/104
(58) Field of Classification Search
USPC ......................................................... 307/104
See application file for complete search history.

(56) References Cited

U.S. PATENT DOCUMENTS

| | | | |
|---|---|---|---|
| 7,989,986 B2 * | 8/2011 | Baarman et al. ............. | 307/104 |
| 2007/0222542 A1 | 9/2007 | Joannopoulos et al. | |
| 2008/0266748 A1 | 10/2008 | Lee | |
| 2008/0278264 A1 | 11/2008 | Karalis et al. | |
| 2009/0079268 A1 * | 3/2009 | Cook et al. .................... | 307/104 |

FOREIGN PATENT DOCUMENTS

| | | |
|---|---|---|
| JP | 2006-60909 | 3/2006 |
| JP | 2006-230129 | 8/2006 |
| JP | 2008-508842 | 3/2008 |
| JP | 2009-501510 | 1/2009 |
| WO | WO 2006/011769 A1 | 2/2006 |
| WO | WO 2007/008646 A2 | 1/2007 |
| WO | WO 2008/118178 A1 | 10/2008 |

OTHER PUBLICATIONS

Japanese office action issued in Japanese App. No. 2009-086565, dated May 28, 2013 (with translation).

* cited by examiner

*Primary Examiner* — Stephen W Jackson
(74) *Attorney, Agent, or Firm* — Greer Burns & Crain Ltd.

(57) ABSTRACT

A wireless electric power supply method includes: supplying electric power from a power supply section to a power-transmission resonance coil at a resonance frequency which causes magnetic field resonance; transmitting the electric power, supplied from the power supply section, as magnetic field energy from the power-transmission resonance coil to a power-reception resonance coil by using the magnetic field resonance, the power-transmission resonance coil being capable of being in magnetic field resonance with the power-reception resonance coil at the resonance frequency; monitoring the electric power supply by using a monitor section; comparing, by using a comparison section, the monitoring result obtained by the monitor section with characteristics data indicating the characteristics of the electric power supply performed by the power supply section; and controlling, by using a control section, the electric power supply performed by the power supply section, on the basis of the comparison result obtained by the comparison section.

14 Claims, 11 Drawing Sheets

WIRELESS ELECTRIC POWER SUPPLY METHOD AND WIRELESS ELECTRIC POWER SUPPLY APPARATUS

CROSS-REFERENCE TO RELATED APPLICATIONS

This application is based upon and claims the benefit of priority of the prior Japanese Patent Application No. 2009-86565, filed on Mar. 31, 2009, the entire contents of which are incorporated herein by reference.

FIELD

The invention relates to a wireless electric power supply method and a wireless electric power supply apparatus, in which, by using a so-called magnetic field resonance mode, electric power is supplied wirelessly.

BACKGROUND

As wireless electric power supply techniques, techniques using electromagnetic induction and techniques using radio waves are known. On the other hand, recently, techniques using a magnetic field resonance mode have been proposed.

Japanese Laid-open Patent Publication No. 2009-501510 discusses the wireless electric power supply techniques using the magnetic field resonance mode, a resonator with a resonance frequency fr1 is provided in a power transmitting device and a resonator with a resonance frequency fr2 is provided in a power receiving device. By tuning these resonance frequencies fr1 and fr2 to each other and adjusting the sizes and the arrangement of the resonators adequately, a coupled state of magnetic fields, in which energy may be transferred by using the magnetic field resonance mode, occurs between the power transmitting device and the power receiving device, and electric power is transmitted from the resonator provided in the power transmitting device to the resonator provided in the power receiving device. According to such wireless electric power supply techniques, electric power transmission efficiency (energy transfer efficiency) may reach about several tens of percent. Also, the distance between the power transmitting device and the power receiving device may be extended to a relatively large value, for example, several tens of centimeters for resonators having a size of several tens of centimeters.

SUMMARY

According to an aspect of the invention, a wireless electric power supply includes: supplying electric power from a power supply section to a power-transmission resonance coil at a resonance frequency which causes magnetic field resonance; transmitting the electric power, supplied from the power supply section, as magnetic field energy from the power-transmission resonance coil to a power-reception resonance coil by using the magnetic field resonance, the power-transmission resonance coil being capable of being in magnetic field resonance with the power-reception resonance coil at the resonance frequency; monitoring the electric power supply by using a monitor section; comparing, by using a comparison section, the monitoring result obtained by the monitor section with characteristics data indicating the characteristics of the electric power supply performed by the power supply section; and controlling, by using a control section, the electric power supply performed by the power supply section, on the basis of the comparison result obtained by the comparison section.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In wireless electric power supply using a magnetic field resonance mode, electric power is transmitted between a power-transmission resonance coil and a power-reception resonance coil by setting a resonant frequency of the power-transmission resonance coil and a resonant frequency of the power-reception resonance coil to the same value. In this way, by using a resonance phenomenon of magnetic fields, electric power may be transmitted at high efficiency, for resonators which have a size of several tens of centimeters, over a medium distance such as from several tens of centimeters to several meters. On the other hand, if the resonance phenomenon of magnetic fields between the power-transmission resonance coil and the power-reception resonance coil may not be used, some type of failure may occur.

It is an object of the present invention to provide a wireless electric power supply method which prevents such failure from occurring in a power transmitting device.

In the disclosed wireless electric power supply method, a power supply section supplies electric power to the power-transmission resonance coil at a resonance frequency which causes magnetic field resonance, and the power-transmission resonance coil, capable of being in magnetic field resonance with the power-reception resonance coil at the resonance frequency, transmits the electric power, supplied from the power supply section, as magnetic field energy to the power-reception resonance coil by using the magnetic field resonance. A monitor section monitors the electric power supply, and a comparison section compares the monitoring result obtained by the monitor section with characteristics data indicating the characteristics of the electric power supply performed by the power supply section. Current or voltage can be monitored. A control section controls the electric power supply, performed by the power supply section, on the basis of the comparison result obtained by the comparison section.

According to the disclosed wireless electric power supply method, the electric power supply, performed by the power supply section, may be controlled. Accordingly, when the resonance phenomenon of magnetic fields between the power-transmission resonance coil and the power-reception resonance coil may not be used, a failure may be prevented from occurring in the power transmitting device.

The inventor has studied various types of failures occurring in a case in which, in wireless electric power supply using the magnetic field resonance mode, it is difficult to maintain the electric power supply between the power-transmission resonance coil and the power-reception resonance coil, due to a problem with the resonance phenomenon of magnetic fields therebetween.

Figure 9A:
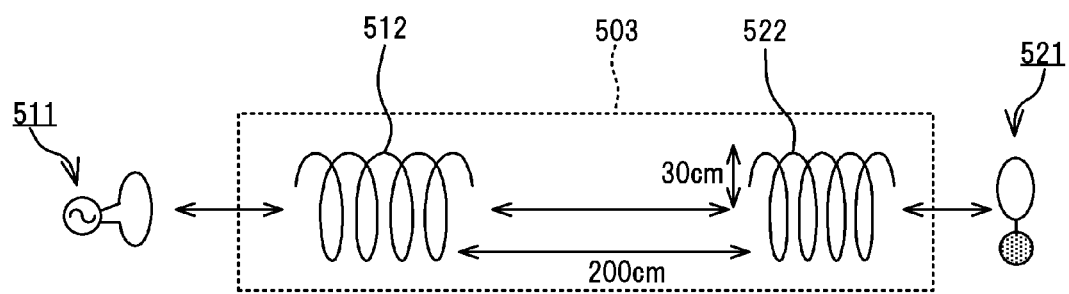
FIGS. 9A and 9B are explanatory diagrams illustrating wireless electric power supply using the magnetic field resonance mode.
Figure 9B:
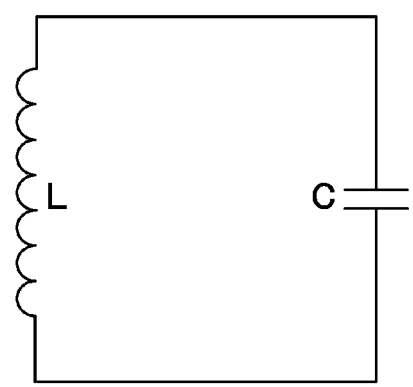

FIGS. 9A and 9B are explanatory diagrams illustrating wireless electric power supply using the magnetic field resonance mode.

As illustrated in FIG. 9A, in the wireless electric power supply using the magnetic field resonance mode, the resonant frequency of the power-transmission resonance coil 512 and the resonant frequency of the power-reception resonance coil 522 are set to the same value f. Accordingly, electric power is transmitted, as magnetic field energy, from the power-transmission resonance coil 512 to the power-reception resonance coil 522 by using the magnetic field resonance. In addition, the power supply section 511 supplies electric power to the power-transmission resonance coil 512 by using electromagnetic induction. The power-reception resonance coil 522 supplies electric power to the power reception section 521 by using electromagnetic induction.

Here, the power-transmission resonance coil 512 is a coil, having inductance L and both ends thereof being open, and includes capacitance C arising from stray capacitance. Accordingly, the power-transmission resonance coil 512 forms an LC resonance circuit as illustrated in FIG. 9B. The resonance frequency f of the power-transmission resonance coil 512 is obtained from an expression (1) on the basis of the inductance L and the capacitance C:

$$f = \frac{1}{2\pi\sqrt{LC}} \quad (1)$$

In the same way, the resonance frequency f of the power-reception resonance coil 522 is obtained.

In FIGS. 10A, 10B, and 11A to 11C, results studied by the inventor are illustrated with regard to the case in which, in the wireless electric power supply using the magnetic field resonance mode, it is difficult to maintain the electric power supply between the power-transmission resonance coil and the power-reception resonance coil, due to a problem with the resonance phenomenon of magnetic fields therebetween.

In addition, in FIGS. 10A, 10B, and 11A to 11C, it is assumed that the distance between the power-transmission resonance coil 512 and the power-reception resonance coil 522 is an optimum distance. As mentioned hereinafter, a coil distance at the time of maximum transmission efficiency is, in other words, an optimum distance d at the resonance frequency f between the power-transmission resonance coil 512 and the power-reception resonance coil 522.

Figure 10A:
FIGS. 10A and 10B are explanatory diagrams illustrating wireless electric power supply using the magnetic field resonance mode.

FIG. 10A illustrates a case in which there is no obstacle between the power-transmission resonance coil 512 and the power-reception resonance coil 522. In this case, the magnetic field resonance between the power-transmission resonance coil 512 and the power-reception resonance coil 522 is normal. Accordingly, electric power transmission is performed normally therebetween.

Figure 10B:
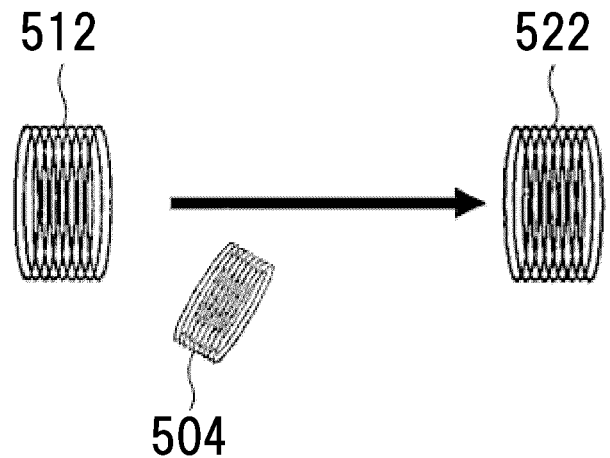

FIG. 10B illustrates a case in which there is an object 504, which is affected by no magnetic field (magnetically transparent), between the power-transmission resonance coil 512 and the power-reception resonance coil 522. The object 504 is, for example, made of plastic or wood or the like. In this case, the object 504 does not interact with the magnetic field. Therefore, the object 504 does not affect the magnetic field resonance between the power-transmission resonance coil 512 and the power-reception resonance coil 522. Accordingly, since the magnetic field resonance between the power-transmission resonance coil 512 and the power-reception resonance coil 522 is normal, electric power transmission is performed normally therebetween.

Figure 11A:
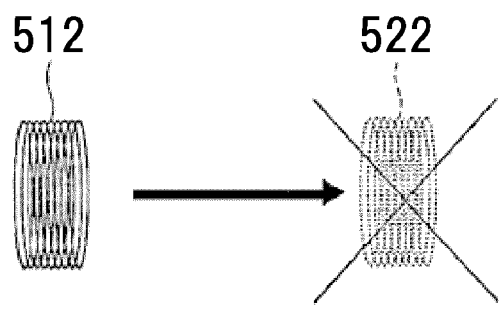
FIGS. 11A to 11C are explanatory diagrams illustrating wireless electric power supply using the magnetic field resonance mode.

On the other hand, FIG. 11A illustrates a case in which the power-reception resonance coil 522, which is to be in magnetic field resonance with the power-transmission resonance coil 512, does not function normally. For example, the case corresponds to a case in which a failure in the power-reception resonance coil 522 prevents normal power reception or a case in which, for some reason, the power-reception resonance coil 522 itself does not exist. In this case, the power-transmission resonance coil 512 may not transmit electric power to the power-reception resonance coil 522. Therefore, electric power which is not transmitted accumulates in the power-transmission resonance coil 512 as thermal energy. As a result, the power-transmission resonance coil 512 produces heat abnormally. Finally, since the temperature of the power-transmission resonance coil 512 becomes extremely high, the power-transmission resonance coil 512 itself is damaged or the surroundings thereof catch fire.

Figure 11B:
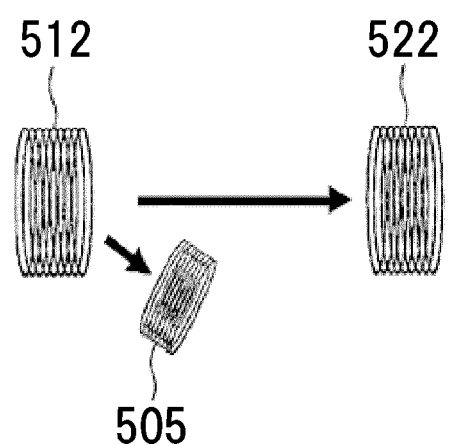

FIG. 11B illustrates a case in which there is an object 505, which absorbs electric power, between the power-transmission resonance coil 512 and the power-reception resonance coil 522. The object 505 is, for example, is made of a conductor such as copper. In this case, the electric power transmitted by the power-transmission resonance coil 512 is absorbed by the object 505 which is nearer to the power-transmission resonance coil 512 than the power-reception resonance coil 522. As a result, the electric power is negligibly transmitted to the power-reception resonance coil 522. In this case, electric power absorption by the object 505 is often insufficient. Therefore, electric power which is not transmitted causes the power-transmission resonance coil 512 itself to produce heat abnormally or to be damaged or the surroundings thereof to catch fire.

In addition, even when the object 505 is not on a straight line connected between the power-transmission resonance coil 512 and the power-reception resonance coil 522, the above-mentioned phenomena occur. In other words, when electric power is transmitted as magnetic field energy between the power-transmission resonance coil 512 and the power-reception resonance coil 522 by using the magnetic field resonance, the object 505 which exists within a magnetic field contributing to the magnetic field resonance becomes an obstacle to electric power transmission using the magnetic field resonance. The following object 506 is similar to the object 505.

Figure 11C:
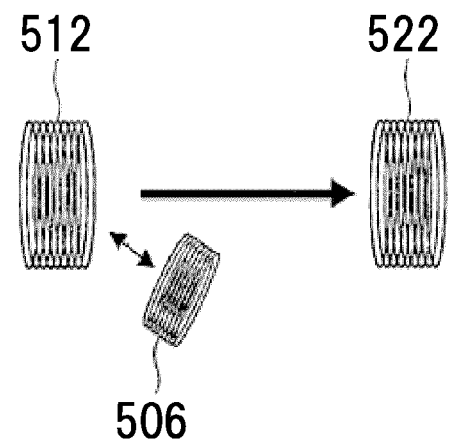

FIG. 11C illustrates a case in which there is an object 506, which does not absorb electric power but affects a magnetic field, between the power-transmission resonance coil 512 and the power-reception resonance coil 522. The object 506 is, for example, a magnetic body. In this case, the existence of the object 506 disturbs the magnetic field between the power-transmission resonance coil 512 and the power-reception resonance coil 522. As a result, the electric power is negligibly transmitted to the power-reception resonance coil 522. Accordingly, as mentioned above, the power-transmission resonance coil 512 itself produces heat abnormally, or the surroundings thereof catch fire.

According to a wireless electric power supply apparatus disclosed hereinafter, even when electric power is not transmitted normally between the power-transmission resonance coil and the power-reception resonance coil, a failure may be prevented from occurring in the power transmitting device.

Figure 1:
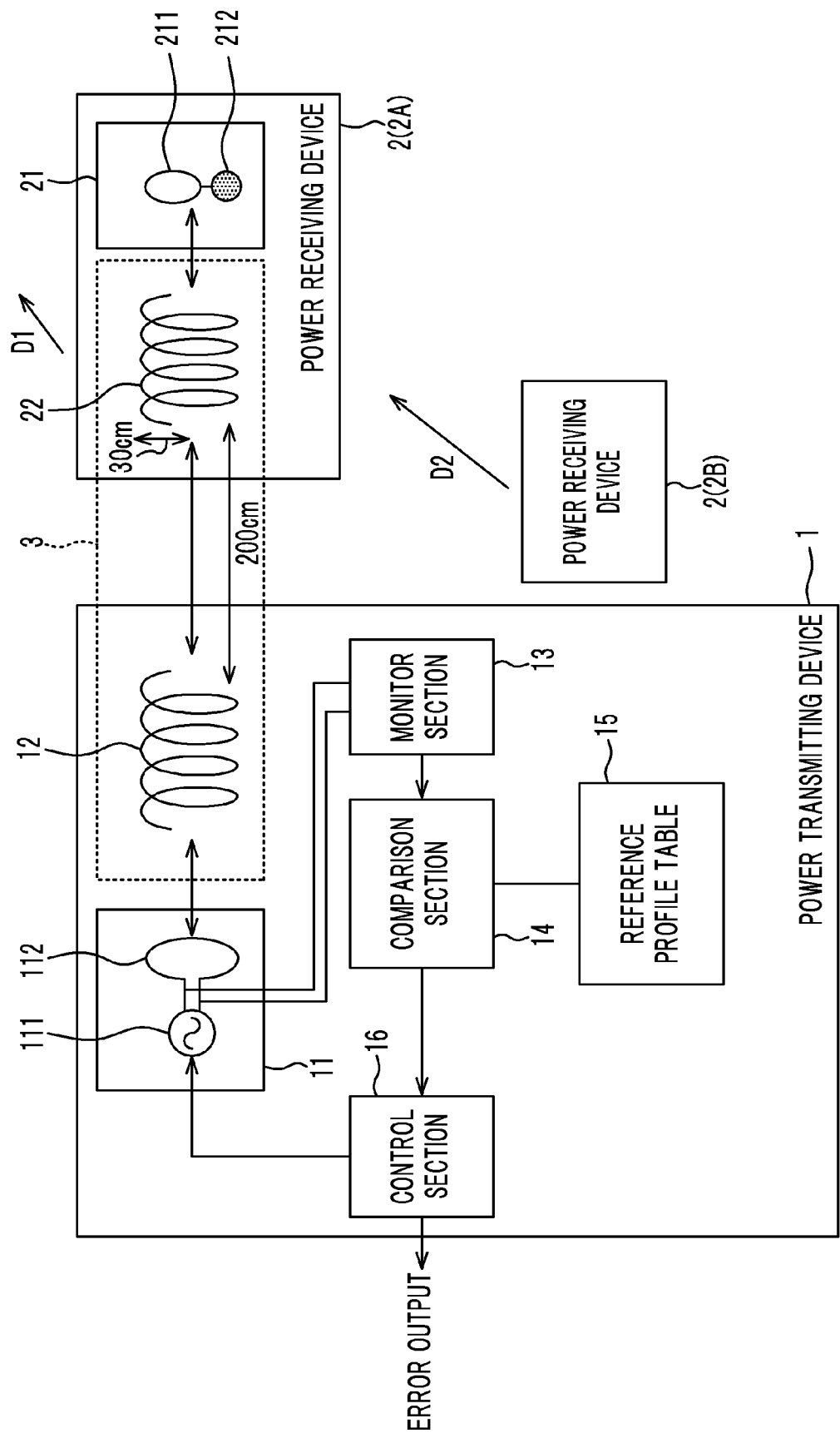
FIG. 1 is a diagram illustrating an example of the structure of a wireless electric power supply apparatus.

FIG. 1 is a diagram illustrating an example of the structure of the wireless electric power supply apparatus.

The wireless electric power supply apparatus includes a power transmitting device 1 and a power receiving device 2 (2A). The power transmitting device 1 and the power receiving device 2 are connected by a magnetic connection 3. The power transmitting device 1 includes a power supply section 11, a power-transmission resonance coil 12, a monitor section 13, a comparison section 14, a reference profile table 15, and a control section 16. The power supply section 11 includes an oscillation circuit 111 and a power supplying coil 112. The power receiving device 2 includes a power reception section 21 and a power-reception resonance coil 22. The power reception section 21 includes a power extracting coil 211 and a load 212.

The monitor section 13, the comparison section 14, and the control section 16 are realized by using a CPU and a program which executes processing operations thereof and is on a main memory. The monitor section 13 further includes, for example, means for measuring such as an ammeter. The reference profile table 15 is provided on a memory.

The magnetic connection 3 is realized by using magnetic field resonance between the power-transmission resonance coil 12 and the power-reception resonance coil 22. By using the magnetic field resonance, the power transmitting device 1 magnetically transmits electric energy to the power receiving device 2.

When a coil distance between the power-transmission resonance coil 12 and the power-reception resonance coil 22 is longer than a distance which causes electromagnetic induction to occur, the magnetic field resonance is formed. In the magnetic field resonance, it is necessary for the resonance frequency of the power-transmission resonance coil 12 to be the same as that of the power-reception resonance coil 22. Consequently, in the wireless electric power supply apparatus illustrated in FIG. 1, the resonant frequency of the power-transmission resonance coil 12 and the resonant frequency of the power-reception resonance coil 22 are set to the same value f so that the magnetic connection 3 is realized at a relatively long distance.

Here, with respect to the identity of resonance frequencies, it is not necessary for the resonance frequencies to be precisely the same but it is good enough that the resonance frequencies are close enough to the same. Whether or not resonance frequencies are close enough is determined on the basis of a Q-value. As the Q-value becomes higher, a range within which resonance frequencies are close enough to the same becomes narrower. In addition, as the Q-value becomes lower, the range becomes wider. For example, the range within which resonance frequencies are virtually the same is a range, upper and lower ends of which correspond to frequencies having a half value with respect to a value at the resonance frequency, respectively. Alternatively, the range within which resonance frequencies are close enough to the same is a range within which target efficiency is accomplished. Alternatively, the range within which resonance frequencies are close enough to the same is a range within which electric power may be transmitted at higher efficiency than electromagnetic induction.

In addition, the coil distance between the power-transmission resonance coil 12 and the power-reception resonance coil 22 is set to an optimum distance with respect to the resonance frequency f. Accordingly, when the power-transmission resonance coil 12 and the power-reception resonance coil 22 are designed, the coil distance may be preliminarily obtained as the optimum distance with respect to the resonance frequency f.

It is necessary for the resonance frequency of the power-transmission resonance coil 12 and that of the power-reception resonance coil 22 to be the same. Therefore, in this example, the power-transmission resonance coil 12 and the power-reception resonance coil 22 are formed in the same configuration. Accordingly, in what follows, only the power-transmission resonance coil 12 will be described and descriptions of the power-reception resonance coil 2 will be omitted. In addition, the same configuration does not always have to be adopted so as to make resonance frequencies the same.

The power-transmission resonance coil 12, for example, can be a helical coil that is made of copper and that is 30 centimeters in diameter. The coil distance is, for example, 200 centimeters. The resonance frequency is, for example, 10 MHz.

The power-transmission resonance coil 12 includes a coil section. The coil section has inductance L and capacitance C as stray capacitance. In addition, the capacitance C is not limited to stray capacitance but may be realized by connecting a physical capacitor. Accordingly, as mentioned above, the power-transmission resonance coil 12 has the resonance frequency f determined on the basis of the inductance L and the capacitance C. The resonance frequency f is obtained from the above-mentioned expression (1) and is a specific value of the power-transmission resonance coil 12.

The power-transmission resonance coil 12 can be a coil, both ends of which are open. No electric circuit is connected to the power-transmission resonance coil 12 so as to increase the Q-value. The power-transmission resonance coil 12 functions as an LC resonance circuit as mentioned hereinafter. The Q-value representing resonance sharpness is determined on the basis of pure resistance of a coil and radiation resistance, and as the values thereof become smaller, the Q-value becomes larger.

When the inductance of the coil section is L, the capacitance of the capacitor is C, and the frequency of alternating-current power supplied from the oscillation circuit 111 is f, the power-transmission resonance coil 12 enters a resonant state at the frequency represented by the expression (1). The frequency f is the resonance frequency f. In the resonant state, energy is periodically exchanged from an electric field caused by a voltage within the capacitor to a magnetic field, caused by an electric current flowing through the coil section, in free space.

When the power-reception resonance coil 22 with the same resonance frequency f is moved closer to the power-transmission resonance coil 12 in the resonant state, the magnetic field from the power-transmission resonance coil 12 causes the power-reception resonance coil 22 to resonate. A resonance phenomenon based on such a magnetic field is called a magnetic field resonance mode. In the magnetic field resonance mode, electric power of the power-transmission resonance coil 12 is wirelessly transferred to the adjacent power-reception resonance coil 22. Namely, the magnetic field resonance mode is a resonance phenomenon of a resonance circuit through the magnetic field. In power transmission using the magnetic field resonance mode, even when the distance between the power-transmission resonance coil 12 and the power-reception resonance coil 22 is longer than the radii of the coils, electric power may be transmitted at high efficiency.

In the power transmitting device 1, the power supply section 11 supplies electric power to the power-transmission resonance coil 12. The oscillation circuit 111 in the power supply section 11 provides an electric source used for supplying electric power to the power supplying coil 112. The oscillation circuit 111 is, for example, a Colpitts oscillation circuit. The oscillation circuit 111 is not limited to the Colpitts oscillation circuit but may employ various types of oscillation circuits. The power supplying coil 112 is supplied with electric power from the oscillation circuit 111, for example, at the resonance frequency f which causes magnetic field resonance between the power-transmission resonance coil 12 and the power-reception resonance coil 22. The oscillation frequency of the oscillation circuit 111 may be a frequency other than the resonance frequency f of the power-transmission resonance coil 12.

The power supplying coil 112 supplies electric power, supplied from the oscillation circuit 111, to the power-transmission resonance coil 12 by using electromagnetic induction. Therefore, the power-transmission resonance coil 12 and the power supplying coil 112 are arranged at a short distance apart which allows electric power to be supplied by using electromagnetic induction. Accordingly, electric power is transmitted between the power supply section 11 and the power-transmission resonance coil 12 by using electromagnetic induction.

Since, between the power-transmission resonance coil 12 and the power supplying coil 112, magnetic field resonance is not used but electromagnetic induction is used, from the standpoint of the power-transmission resonance coil 12 it is not necessary to consider the resonance frequency of the power supplying coil 112. Accordingly, with respect to the power supplying coil 112, it is not necessary to consider that the oscillation circuit 111 connected to the power supplying coil 112 causes the resonance frequency of the power-transmission resonance coil 12 to vary. Therefore, the use of the power supplying coil 112 may improve the freedom of design of the oscillation circuit 111. On the other hand, from the standpoint of consistency with the power-transmission resonance coil 12, the oscillation frequency of the oscillation circuit 111 is set to oscillate at the resonance frequency f of the power-transmission resonance coil 12.

The power-transmission resonance coil 12 may be in magnetic field resonance with the power-reception resonance coil 22 at the resonance frequency f which causes the magnetic field resonance. To the power-reception resonance coil 22, the power-transmission resonance coil 12 transmits the electric power, supplied from the power supply section 11, as magnetic field energy by using magnetic field resonance, or by using electromagnetic induction.

In the power receiving device 2, the power-reception resonance coil 22 may be in magnetic field resonance with the power-transmission resonance coil 12 at the resonance frequency f. The power-reception resonance coil 22 receives the magnetic field energy transmitted from the power-transmission resonance coil 12, by using the magnetic field resonance. As mentioned above, the resonance frequency of the power-reception resonance coil 22 is coincident with the resonance frequency f of the power-transmission resonance coil 12.

The power reception section 21 outputs, as electric power, the energy received by the power-reception resonance coil 22. The power extracting coil 211 in the power reception section 21 extracts electric power from the power-reception resonance coil 22 by using the electromagnetic induction. Therefore, the power-reception resonance coil 22 and the power extracting coil 211 are arranged at a short distance apart which allows electric power to be extracted by using electromagnetic induction. Accordingly, electric power is transmitted between the power-reception resonance coil 22 and the power reception section 21.

Since, between the power-reception resonance coil 22 and the power reception section 21, magnetic field resonance is not used but electromagnetic induction is used, from the standpoint of the power-reception resonance coil 22 it is not necessary to consider the resonance frequency of the power extracting coil 211. Therefore, the use of the power extracting coil 211 may improve design flexibility of the power reception section 21.

The power extracting coil 211 is connected to the load 212. The load 212 consumes the electric power extracted from the power extracting coil 211. The load 212 is, for example, an electronics device, a battery, or an incandescent lamp or the like. In addition, actually an output circuit, which transforms the extracted electric power to electric power to be consumed in the load 212, is connected between the power supplying coil 112 and the load 212. The output circuit is, for example, an AC-DC convertor, a voltage conversion circuit, a transformer, a rectifier circuit, or a charging circuit which monitors the amount of charge, or the like.

Here, the wireless electric power supply apparatus is applied to, for example, an automobile, an in-plant robot, or an in-home robot or the like. Mobile objects such as the automobile and the robot or the like include, as the load 212, batteries used for driving themselves. The power receiving device 2 is provided in the mobile objects such as the automobile and the robot or the like. In addition, for example, the power transmitting device 1 is provided in a car park or a power feeding station.

The power receiving device 2 moves in accordance with the movement of the mobile object equipped therewith. Accordingly, as illustrated in FIG. 1, while a power receiving device 2A moves in a certain direction D1 and moves away from the power transmitting device 1, instead another power receiving device 2B moves closer to the power transmitting device 1.

In this way, the mobile object equipped with the power receiving device 2 moves. In addition, as mentioned above, the coil distance, that is, the distance between the power-transmission resonance coil 12 and the power-reception resonance coil 22 is relatively long. For these reasons, there arises a situation in which other objects 505 and 506 stand between the power-transmission resonance coil 12 and the power-reception resonance coil 22 as illustrated in FIGS. 11B and 11C. Alternatively, as illustrated in FIG. 11A, the power-reception resonance coil 22 might be damaged due to a collision during the movement or the like.

Consequently, the monitor section 13 monitors electric power supply between the power-transmission resonance coil 12 and the power-reception resonance coil 22. Therefore, the monitor section 13 includes, for example, an ammeter and a voltmeter, both connected between the oscillation circuit 111 and the power supplying coil 112, as illustrated in FIG. 1. Accordingly, the monitor section 13 obtains, as a monitoring result of electric power supply, two measurement results corresponding to a current and a voltage measured between the oscillation circuit 111 and the power supplying coil 112, respectively. The measurement results measured between the oscillation circuit 111 and the power supplying coil 112 illustrate the state of electric power transmission between the power-transmission resonance coil 12 and the power-reception resonance coil 22. Since the measurement results depend on the frequency, the measurement results are referred to as "frequency profile".

The monitoring of transmitted electric power is performed by various means. For example, electric power transmitted between the oscillation circuit 111 and the power supplying coil 112 may be measured by using an electric power meter. In place of the electric power meter, other measuring means having no effect on the oscillation circuit 111 and the power supplying coil 112, may be used. For example, a hall element can be arranged near the power supplying coil 112 and used for detecting the intensity of a magnetic field caused in proportion to a current flowing through the power supplying coil 112. Then, the detection output may be used as a current value. In addition, in place of the current flowing through the power supplying coil 112, the current flowing through the power-transmission resonance coil 12 may be measured. To detect the current flowing through the power-transmission resonance coil 12, a hall element can be arranged near the power-transmission resonance coil 12 and a current value detected on the basis of a detection output from the hall element.

When electric power transmission between the power-transmission resonance coil 12 and the power-reception resonance coil 22 starts in response to switching on of a switch used for starting power transmission, for example, the monitor section 13 starts to monitor the power transmission therebetween. The monitor section 13 transmits the monitoring result to the comparison section 14, for example, by using a wired line.

Here, it is necessary to prevent, with certainty, abnormal heating and damage of the power-transmission resonance coil 12 from occurring. Therefore, actually, after electric power with a relatively small first output value (low output) has been transmitted first, and normal electric-power transmission has been checked, electric power with a second output value (normal output) that is larger than the first output value is transmitted. Transmission with the first output value (low output) corresponds to a first transmission mode or a sweep mode. Transmission with the second output value (normal output) corresponds to a second transmission mode or a normal mode. The second output value is an output value which is actually used for transmitting electric power from the oscillation circuit 111, the power supplying coil 112, and the power-transmission resonance coil 12. The first output value is, for example, from one tenth to one hundredth of the second output value. The electric power transmission with the first output value and the monitoring result thereof are repeated periodically as mentioned hereinafter.

First the control section 16 causes the power supply section 11 to supply electric power with the first output value (low output) to the power-transmission resonance coil 12. At this time, furthermore, the control section 16 causes the power supply section 11 to vary the frequency of the electric power, supplied by the power supply section 11 itself, within a given range including the resonance frequency. Namely, the control section 16 causes the power supply section 11 to continuously sweep the frequency within the range. In other words, a frequency sweep is performed. Therefore, while the power supply section 11 varies the frequency of electric power to be supplied, so as to sweep the frequency within the range, the power supply section 11 supplies the electric power with the first output value (low output) to the power-transmission resonance coil 12. Consequently, the above-mentioned "frequency profile", indicating how the electric power transmission varies with the frequency, is obtained.

In the state, as mentioned above, the monitor section 13 monitors electric power transmission with the first output value. The comparison section 14 receives the monitoring result transmitted from the monitor section 13 and compares the monitoring result, performed by the monitor section 13, of the electric power transmission with the first output value with the "frequency profile" which is characteristics data indicating characteristics of the electric power supply performed by the power supply section 11. As the monitoring result obtained by the monitor section 13, two measurement results, corresponding to a current and a voltage measured between the oscillation circuit 111 and the power supplying coil 112, respectively, are used. As the characteristics data, a "reference profile", which is data stored in the reference profile table 15 in the memory, is used. The "reference profile" is read out from the reference profile table 15 by the comparison section 14 ahead of the comparison. The two measurement results and the characteristics data will be described hereinafter.

For the above-mentioned sweep, according to the control performed by the control section 16, the oscillation circuit 111 in the power supply section 11 continuously varies the oscillation frequency within the above-mentioned range. For example, the control section 16 continuously varies the inductance L (actually, substitution of an equivalent ceramic oscillator or crystal oscillator for the inductance L) in the oscillation circuit 111 such as a Colpitts oscillation circuit. Therefore, the inductance L is variable, and the control section 16 generates a control signal used for continuously varying the value of the inductance L and sequentially supplies the generated control signal to the inductance L. In addition, in the oscillation circuit 111 such as the Colpitts oscillation circuit, the capacitance C1 or C2 may be continuously varied. As mentioned hereinafter, the initial value of the oscillation frequency is set to fs, and the termination value is set to fe. The output value of electric power output by the oscillation circuit 111 is fixed at the first output value (low output).

The control section 16 controls electric power supply performed by the power supply section 11, on the basis of the comparison result obtained by the comparison section 14. Specifically, when the comparison result obtained by the comparison section 14 and the monitoring result obtained by the monitor section 13 are normal, the control section 16 causes the power supply section 11 to supply the electric power with the second output value (normal output) being larger than the first output value. In addition, when the comparison result obtained by the comparison section 14 and the monitoring result obtained by the monitor section 13 are abnormal, the control section 16 causes the power supply section 11 to halt supply of the electric power. Accordingly, after it is detected that the monitoring result is abnormal, the electric power transmission with the second output value (normal output) is not performed. In this case, furthermore, the control section 16 outputs an error signal indicating that the monitoring result is abnormal. Consequently, an operator may realize that the electric power transmission is abnormal.

According to the control performed by the control section 16, the power supply section 11 supplies electric power to the power-transmission resonance coil 12. At this time, the power supply section 11 also sets the frequency and the output value of electric power supplied to the power-transmission resonance coil 12, according to the control performed by the control section 16. In addition, according to the control performed by the control section 16, the power supply section 11 halts supply of the electric power to the power-transmission resonance coil 12.

Next, comparison processing performed by the comparison section 14 will be described with reference to FIGS. 2 to 6. FIGS. 2 to 6 are explanatory diagrams illustrating wireless electric power supply using the magnetic field resonance mode and illustrate the relation between transmission frequencies and transmitted electric power. In addition, it is assumed that the distance between the power-transmission resonance coil 12 and the power-reception resonance coil 22 is an optimum distance.

In FIGS. 2 to 6, horizontal axes illustrate the frequency, and vertical axes illustrate the transmitted electric power (dB). The frequency corresponds to the frequency of the power-transmission resonance coil 12 and the frequency of the power-reception resonance coil 22 at the time of electric power transmission. In addition, f corresponds to the resonance frequency of the power-transmission resonance coil 12 and the resonance frequency of the power-reception resonance coil 22.

Figure 2:
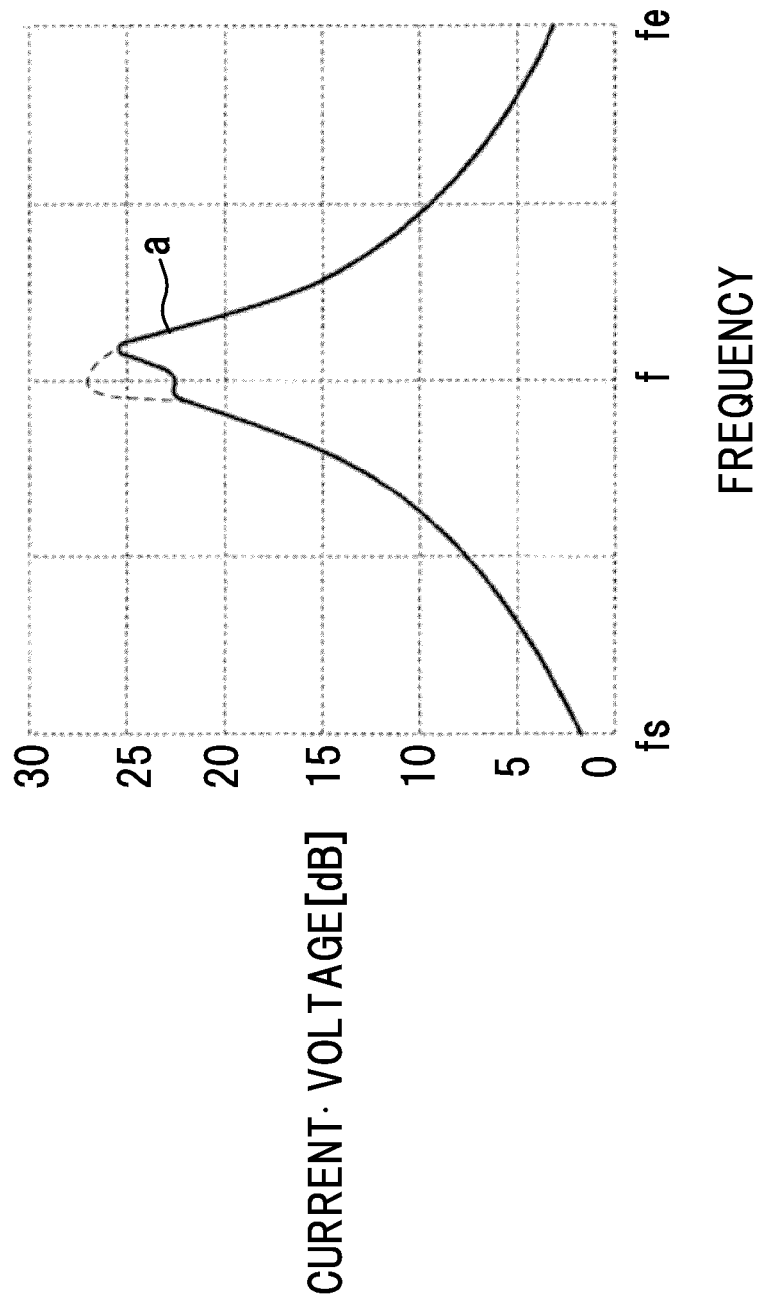
FIG. 2 is an explanatory diagram illustrating wireless electric power supply using a magnetic field resonance mode.

FIG. 2 is characteristics data indicating the characteristics of electric power supply performed by the power supply section 11 and data read out from the reference profile table 15 in the memory. When the power-transmission resonance coil 12 is designed, the characteristics data may be obtained from simulation. Alternatively, the characteristics data may be obtained by actually transmitting electric power in an ideal state between the power-transmission resonance coil 12 and the power-reception resonance coil 22 before start of operations. In other words, FIG. 2 illustrates a state in which the power-transmission resonance coil 12 is supposed to be, namely a state in which electric-power is transmitted normally between the power-transmission resonance coil 12 and the power-reception resonance coil 22.

The transmission electric power varies as illustrated by a curve as illustrated in FIG. 2. Namely, the transmission electric power peaks in the vicinity of the resonance frequency f and is transmitted at peak efficiency. In addition, in FIG. 2, the shape of the curve a is slightly distorted in the vicinity of the top thereof. The distorted characteristic depends on various conditions other than the resonance frequencies of the power-transmission resonance coil and the power-reception resonance coil. Therefore, in FIG. 2, when the transmission frequency is the resonance frequency f, the transmission electric power does not peak. However, it may be assumed that ideally the transmission electric power peaks when the transmission frequency is the resonance frequency f, as illustrated by a dotted line.

In addition, in FIG. 2, frequencies fs to fe correspond to the sweep range. The range includes the resonance frequency, as mentioned above. The sweep range may be preliminarily set. The power supply section 11 varies the frequency of supplied electric power within the sweep range. In other words, the frequency of electric power supplied by the power supply section 11 is varied sequentially from the value fs to the value fe.

A profile illustrated in FIG. 2 illustrates that electric power is transmitted normally between the power-transmission resonance coil 12 and the power-reception resonance coil 22. The profile illustrated in FIG. 2 is to be compared with profiles illustrated in FIGS. 3 to 6.

In addition, the profile illustrated in FIG. 2 indicates a monitoring result of electric power supply monitored by the monitor section 13 in the case in which the power-transmission resonance coil 12 is in any one of the states illustrated in FIGS. 10A and 10B. In this case, the monitoring result of electric power supply is coincident with or similar to the profile illustrated in FIG. 2. Accordingly, when the power-transmission resonance coil 12 is in any one of the states illustrated in FIGS. 11A to 11B, the monitoring result of electric power supply is as illustrated in FIG. 3 and it is detected that the electric power supply is in an abnormal state.

Here, the "frequency profile" which is the monitoring result of electric power supply is obtained in a state (sweep mode) in which electric power with the first output value (low output) is transmitted. Then, the "reference profile" of FIG. 2 is prepared with respect to the state in which electric power with the first output value (low output) is transmitted. In this case, the "frequency profile" and the "reference profile" are coincident with each other. On the other hand, when the "reference profile" illustrated in FIG. 2 is prepared with respect to a state in which electric power with the second output value (normal output) is transmitted, the "frequency profile" and the "reference profile" are similar to each other. The following cases are the same as this case.

FIGS. 3 to 6 illustrate monitoring results transmitted from the monitor section 13 and measurement results corresponding to a current and a voltage measured between the oscillation circuit 111 and the power supplying coil 112. In other words, FIGS. 3 to 6 illustrate an actual state of the power-transmission resonance coil 12 at the time, that is, a state in which electric-power is not transmitted normally between the power-transmission resonance coil 12 and the power-reception resonance coil 22. In addition, in FIGS. 3 to 6, the curve a illustrated in FIG. 2 is indicated for reference.

Figure 3:
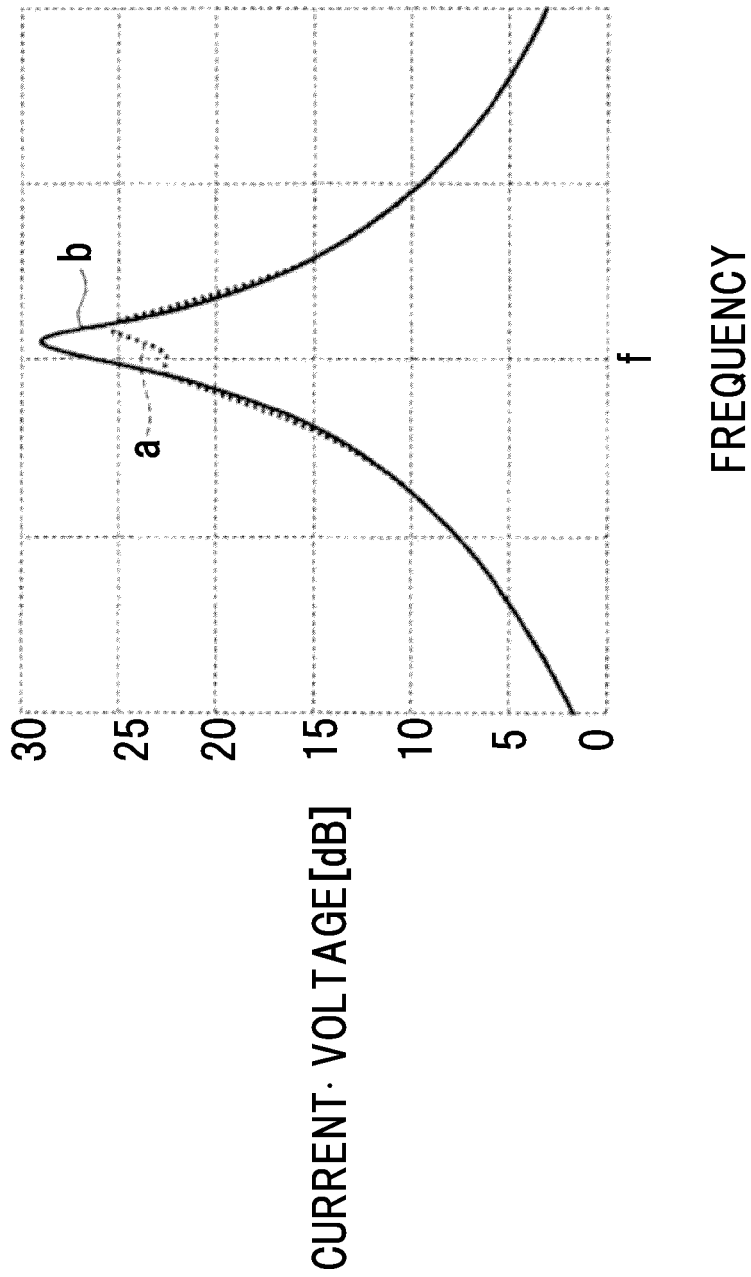
FIG. 3 is an explanatory diagram illustrating wireless electric power supply using the magnetic field resonance mode.

A profile illustrated in FIG. 3 indicates a monitoring result of electric power supply monitored by the monitor section 13 in the case in which the power-transmission resonance coil 12 is in any one of the states (failed states) illustrated in FIGS. 11A to 11C. When the power-transmission resonance coil 12 is in any one of the states illustrated in FIGS. 11A to 11C, transmitted electric power varies as illustrated by a curve b illustrated in FIG. 3. Namely, the amount of transmitted electric power in the curve b illustrated in FIG. 3 becomes, at the peak thereof, larger than the curve a. In this way, the monitoring result of electric power supply illustrated in FIG. 3 is neither coincident with nor similar to the profile illustrated in FIG. 2. Accordingly, when the power-transmission resonance coil 12 is in any one of the states illustrated in FIGS. 11A to 11C, the monitoring result of electric power supply is as illustrated in FIG. 3 and it is detected that the electric power supply is in an abnormal state.

Figure 4:
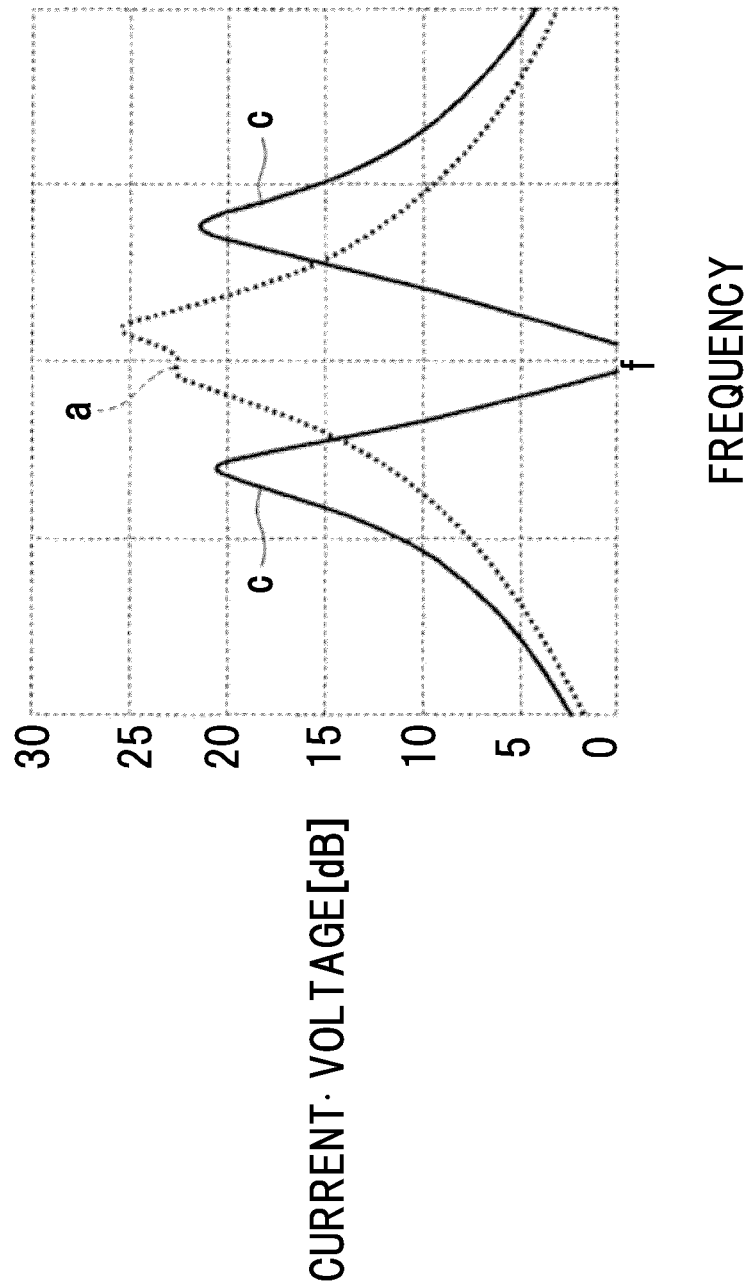
FIG. 4 is an explanatory diagram illustrating wireless electric power supply using the magnetic field resonance mode.

FIG. 4 illustrates a monitoring result of electric power supply monitored by the monitor section 13 in the case in which the power-transmission resonance coil 12 is in a state illustrated in FIG. 4. When the power-transmission resonance coil 12 is in the state illustrated in FIG. 4, transmitted electric power varies as illustrated by a curve c illustrated in FIG. 4. Namely, the amount of transmitted electric power in the curve c illustrated in FIG. 4 has two peaks, namely, becomes in a split state. In this way, the monitoring result of electric power supply illustrated in FIG. 4 is neither coincident with nor similar to the profile illustrated in FIG. 2. Accordingly, when the power-transmission resonance coil 12 is in the state illustrated in FIG. 4, the monitoring result of electric power supply is as illustrated in FIG. 4 and it is detected that the electric power supply is in an abnormal state.

Figure 5:
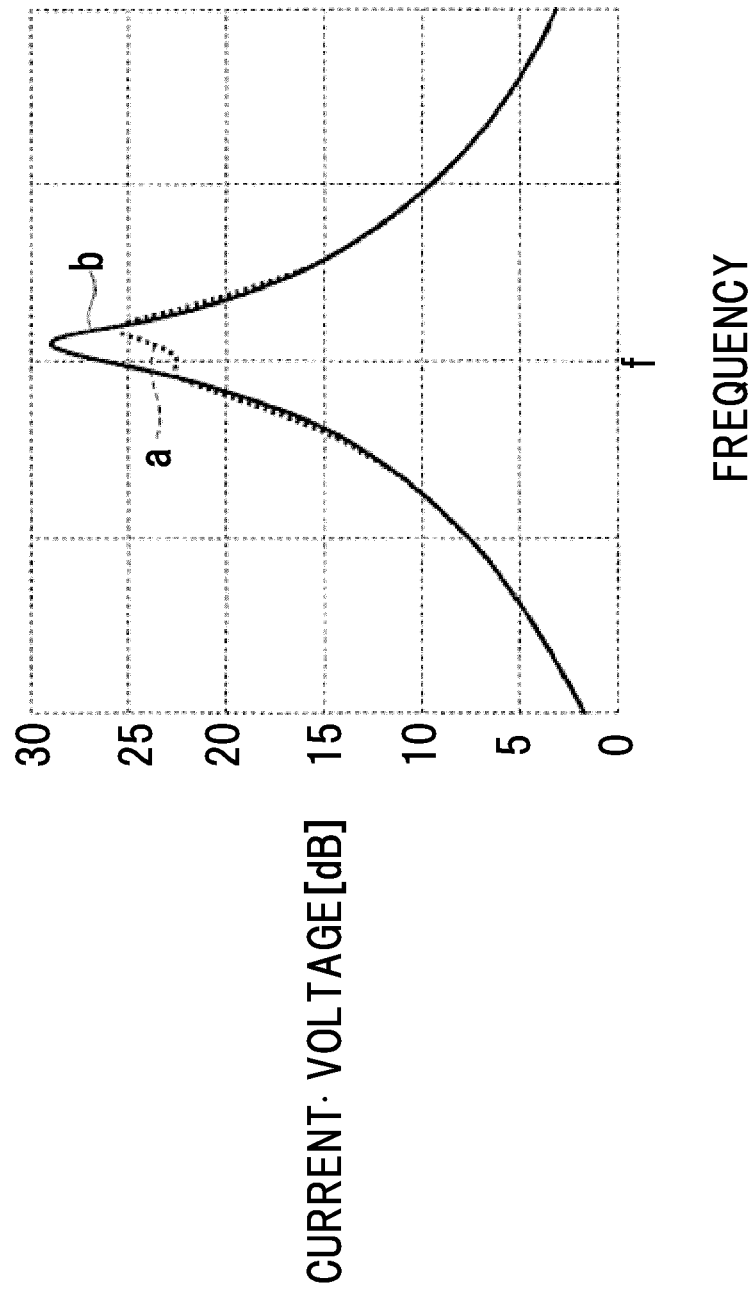
FIG. 5 is an explanatory diagram illustrating wireless electric power supply using the magnetic field resonance mode.
Figure 6:
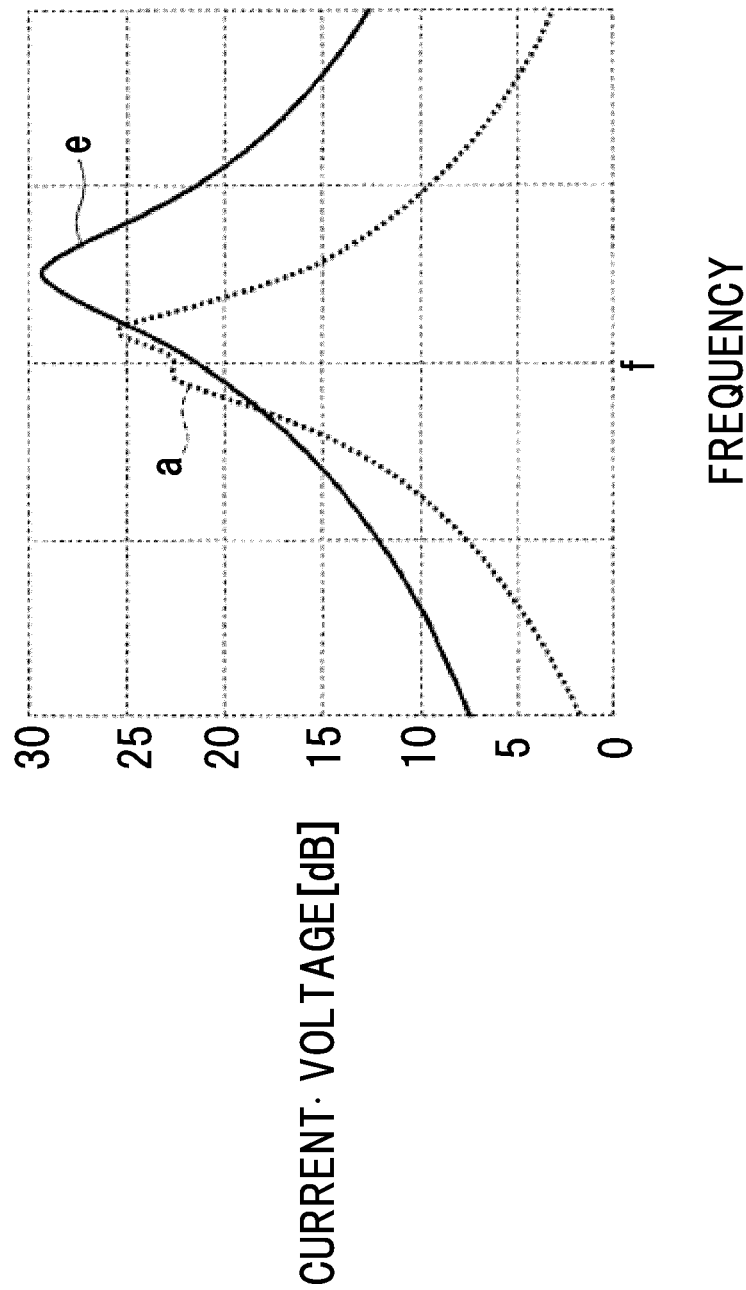
FIG. 6 is an explanatory diagram illustrating wireless electric power supply using the magnetic field resonance mode.

FIGS. 5 and 6 illustrate monitoring results of electric power supply monitored by the monitor section 13 in the case in which the power-transmission resonance coil 12 is in a state illustrated in FIG. 5. When the power-transmission resonance coil 12 is in the state illustrated in FIG. 5, transmitted electric power varies as illustrated by a curve d illustrated in FIG. 5 or a curve e illustrated in FIG. 6. Namely, the amount of transmitted electric power in the curve d illustrated in FIG. 5 or a curve e illustrated in FIG. 6 becomes, at the peak thereof, larger than the curve a. In this way, the monitoring result of electric power supply illustrated in FIG. 5 or 6 is neither coincident with nor similar to the profile illustrated in FIG. 2. Accordingly, when the power-transmission resonance coil 12 is in the state illustrated in FIG. 5, the monitoring result of electric power supply is as illustrated in FIG. 5 or 6 and it is detected that the electric power supply is in an abnormal state. In addition, whether the monitoring result of electric power supply corresponds to FIG. 5 or 6 depends on the states of the power-transmission resonance coil 12 and the object 506.

Figure 7:
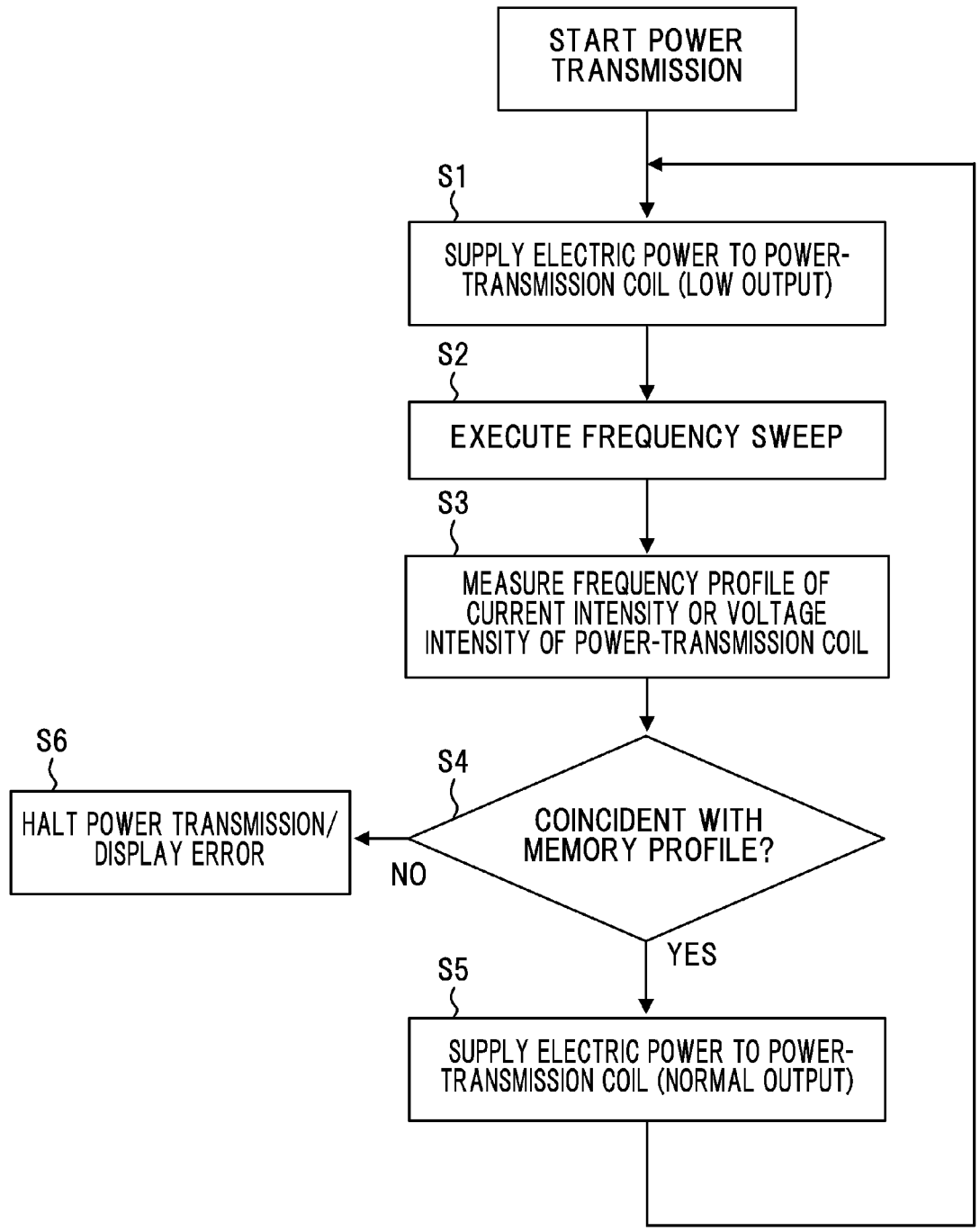
FIG. 7 is a flowchart illustrating monitoring process operations performed in the wireless electric power supply apparatus.

FIG. 7 is a flowchart illustrating monitoring process operations performed in the wireless electric power supply apparatus.

The control section 16 causes the power supply section 11 to supply electric power with the first output value (low output) to the power-transmission resonance coil 12. In response, the power supply section 11 supplies electric power with the first output value to the power-transmission resonance coil 12 (Operation S1). At this time, the frequency of electric power supplied to the power-transmission resonance coil 12 is set to a frequency causing magnetic field resonance between the power-transmission resonance coil 12 and the power-reception resonance coil 22, and the coil distance therebetween is set to the optimum distance d.

The control section 16 causes the power supply section 11 to continuously sweep the frequency within the given range. In response, the power supply section 11 continuously varies the frequency of output electric power within the given range including the resonance frequency (Operation S2). Namely, the frequency of electric power supplied by the power supply section 11 is varied sequentially (swept), for example, from the frequency fs to the frequency fe. At this time, the coil distance and the resonance frequency are not varied.

In this state, the monitor section 13 monitors electric power supply with the first output value. Specifically, the monitor section 13 measures the frequency profile of a current (or a voltage) relating to the electric power supplied to the power-transmission resonance coil 12 (Operation S3).

The comparison section 14 compares the frequency profile which is the monitoring result performed by the monitor section 13 with the reference profile table 15, which is characteristics data indicating characteristics of the electric power supply performed by the power supply section 11. Specifically, the comparison section 14 determines whether or not the frequency profile is coincident with the reference profile (Operation S4).

For example, if the power-transmission resonance coil 12 transmits electric power to the power-reception resonance coil 22 and the power-reception resonance coil 22 receives the transmitted magnetic field energy normally, the frequency profile is coincident with the reference profile.

When, as the result of the comparison performed by the comparison section 14, the monitoring result performed by the monitor section 13 is normal, that is, the frequency profile is coincident with the reference profile (Operation S4 YES), the control section 16 causes the power supply section 11 to supply electric power with the second output value (normal output) being larger than the first output value. In response, the power supply section 11 supplies the electric power with the second output value to the power-transmission resonance coil 12 (Operation S5).

After that, the control section 16 repeats Operation 51 after given time elapses. Accordingly, abnormality of the power-transmission resonance coil 12 may be monitored periodically. The given time may be set empirically and, for example, is set to from several tens of seconds to several minutes. When such time is set, the power-transmission resonance coil 12 produces a little heat. However, the power-transmission resonance coil 12 does not produce heat abnormally or become damaged.

When, as the result of the comparison performed by the comparison section 14, the monitoring result performed by the monitor section 13 is abnormal, that is, the frequency profile is not coincident with the reference profile (Operation S4 NO), the control section 16 causes the power supply section 11 to halt supply of the electric power and outputs an error signal indicating that the monitoring result is abnormal. In response, the power supply section 11 halts supply of the electric power to the power-transmission resonance coil 12 (Operation S6). Accordingly, abnormal heating and damage of the power-transmission resonance coil 12 may be prevented from occurring.

Figure 8:
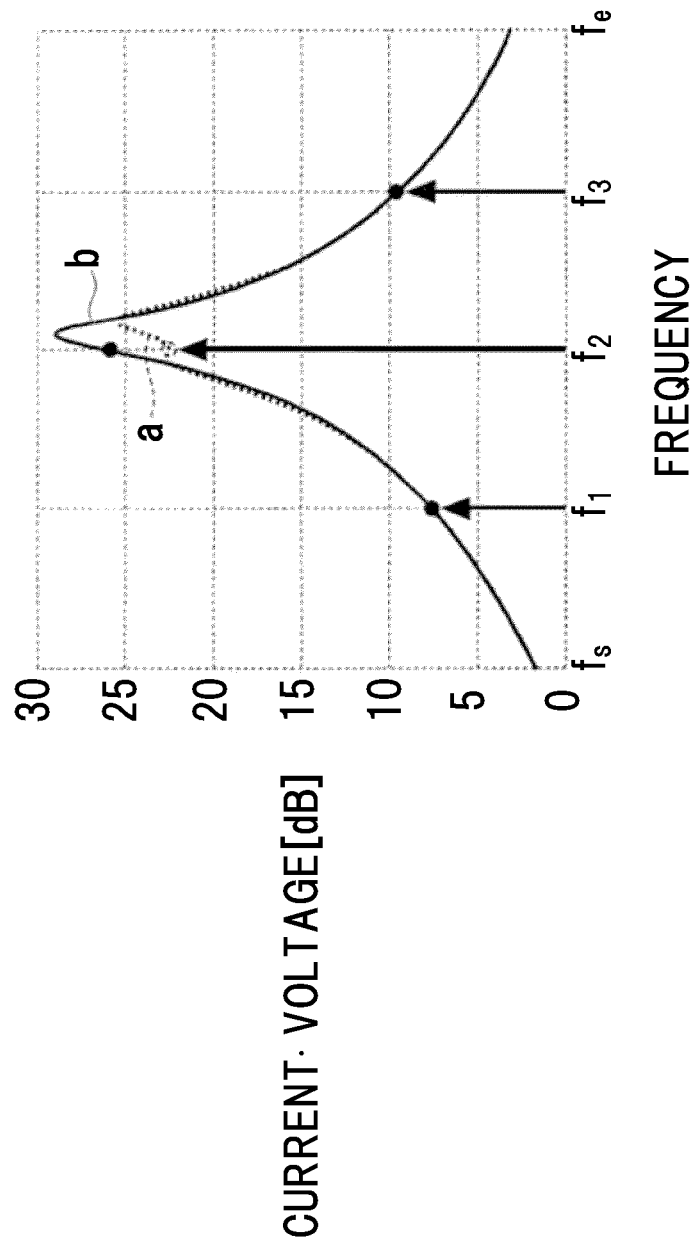
FIG. 8 is a diagram illustrating another example of the structure of the wireless electric power supply apparatus.

FIG. 8 is a diagram illustrating another example of the structure of the wireless electric power supply apparatus, and an example in which the frequency of electric power supplied by the power supply section 11 is varied discretely.

The control section 16 does not cause the power supply section 11 to continuously sweep the frequency of electric power supplied by the power supply section 11 within the given range from the frequency fs to the frequency fe but causes the power supply section 11 to discretely vary the frequency to a plurality of given discrete values. The range from the frequency fs to the frequency fe is a given range including the resonance frequency f.

For example, the frequency of electric power supplied by the power supply section is varied to f1, f2, and f3 in this order, as illustrated in FIG. 8. The number of selected frequencies is not limited to three but various numbers may be selected. For example, as the frequency of electric power supplied by the power supply section, frequencies fs and fe may be added to the range, in addition to the three frequencies f1, f2, and f3. Accordingly, time taken for profile measurement processing and time taken for profile comparison processing may be shortened, compared with the case in which the frequency is continuously swept.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. A wireless electric power supply method comprising the operation of:
   supplying electric power from a power supply section having a power supplying coil to a power-transmission resonance coil at a resonance frequency which causes magnetic field resonance, the power supplying coil being different from the power-transmission resonance coil;
   transmitting the electric power, supplied from the power supply section, as magnetic field energy from the power-transmission resonance coil to a power-reception resonance coil by using the magnetic field resonance, the power-transmission resonance coil being capable of being in magnetic field resonance with the power-reception resonance coil at the resonance frequency;

monitoring the electric power supply from the power supplying coil to the power-transmission resonance coil by using a monitor section;

comparing, by using a comparison section, the monitoring result obtained by the monitor section with characteristics data indicating the characteristics of the electric power supply performed by the power supply section; and controlling, by using a control section, the electric power supply performed by the power supply section, on the basis of the comparison result obtained by the comparison section.

2. The wireless electric power supply method according to claim 1, wherein when the comparison result obtained by the comparison section and the monitoring result obtained by the monitor section are normal, the control section causes the power supply section to supply the electric power.

3. The wireless electric power supply method according to claim 1, wherein when the comparison result obtained by the comparison section and the monitoring result obtained by the monitor section are abnormal, the control section causes the power supply section to halt supply of the electric power.

4. The wireless electric power supply method according to claim 3, wherein when the comparison result obtained by the comparison section and the monitoring result obtained by the monitor section are abnormal, the control section outputs an error signal indicating that the monitoring result is abnormal.

5. The wireless electric power supply method according to claim 1, wherein the control section causes the power supply section to supply the electric power with a first output value to the power-transmission resonance coil;

the monitor section monitors the electric power supply with the first output value; the comparison section compares the monitoring result of the electric power supply with the first output value, the monitoring result being obtained by the monitor section, with the characteristics data indicating the characteristics of the electric power supply performed by the power supply section; and when the comparison result obtained by the comparison section and the monitoring result obtained by the monitor section are normal, the control section causes the power supply section to supply the electric power with a second output value larger than the first output value.

6. The wireless electric power supply method according to claim 5, wherein when the control section causes the power supply section to supply the electric power with the first output value to the power-transmission resonance coil, the monitor section monitors the electric power supply with the first output value under the condition that the frequency of the electric power supplied by the power supply section is varied within a given frequency range including the resonance frequency.

7. The wireless electric power supply method according to claim 6, wherein the control section causes the power supply section to sweep the frequency continuously within the given frequency range.

8. The wireless electric power supply method according to claim 6, wherein the control section causes the power supply section to vary the frequency discretely to a plurality of given values within the given frequency range.

9. The wireless electric power supply method according to claim 1, wherein the power-transmission resonance coil, which is capable of being in magnetic field resonance with the power-reception resonance coil at the resonance frequency, receives the magnetic field energy transmitted from the power-transmission resonance coil by using the magnetic field resonance; and a power reception section outputs, as electric power, the magnetic field energy received by the power-reception resonance coil.

10. A wireless electric power supply apparatus comprising:
a power supply section, including a power supplying coil configured to supply electric power at a resonance frequency which causes magnetic field resonance;
a power-transmission resonance coil configured to transmit the electric power, supplied from the power supply section, as magnetic field energy by using the magnetic field resonance, the power-transmission resonance coil being capable of being in magnetic field resonance with a power-reception resonance coil at the resonance frequency, the power-transmission resonance coil being different from the power supplying coil;
the power-reception resonance coil being configured to receive the magnetic field energy, transmitted from the power-transmission resonance coil, by using the magnetic field resonance, the power-reception resonance coil being capable of being in magnetic field resonance with the power-transmission resonance coil at the resonance frequency; a power reception section configured to output, as electric power, the magnetic field energy received by the power-reception resonance coil; a store section configured to store characteristics data indicating the characteristics of the electric power supply;
a monitor section configured to monitor the electric power supply from the power supplying coil to the power-transmission resonance coil;
a comparison section configured to compare the monitoring result obtained by the monitor section with the characteristics data indicating the characteristics of the electric power supply performed by the power supply section; and
a control section configured to control the electric power supply, performed by the power supply section, on the basis of the comparison result obtained by the comparison section.

11. A wireless electric power supply apparatus comprising:
a power supply section, including a power supplying coil configured to supply electric power at a resonance frequency which causes magnetic field resonance;
a power-transmission resonance coil configured to transmit the electric power, supplied from the power supply section, as magnetic field energy by using the magnetic field resonance, the power-transmission resonance coil being capable of being in magnetic field resonance with a power-reception resonance coil at the resonance frequency, the power-transmission resonance coil being different from the power supplying coil;
a control section configured to cause the power-transmission resonance coil to be supplied with electric power at a plurality of frequencies;
a monitor section configured to monitor characteristics between the power-transmission resonance coil and the power supplying coil arising when the power-transmission resonance coil is supplied with electric power at the plurality of frequencies from the power supplying coil;
a store section configured to store characteristics data indicating the characteristics of the power-transmission resonance coil, the characteristics data corresponding to the plurality of frequencies;
a comparison section configured to compare the characteristics result obtained by the monitor section with the characteristics data stored in the store section; and a control section configured to control the electric power supply, performed by the power supply section, on the basis of the comparison result obtained by the comparison section.

12. The wireless electric power supply method according to claim 1, wherein at least one of a voltage and a current between an oscillation circuit included in the power supply section and the power supplying coil is monitored by the monitor section.

13. The wireless electric power supply apparatus according to claim 10, wherein the power supply section includes an oscillation circuit, and the monitor section monitors at least one of a voltage and a current between the oscillation circuit and the power supplying coil.

14. The wireless electric power supply apparatus according to claim 11, wherein the power supply section includes an oscillation circuit, and the monitor section monitors at least one of a voltage and a current between the oscillation circuit and the power supplying coil.

* * * * *